United States Patent
Kuwamura (10) Patent No.: US 7,483,230 B2
(45) Date of Patent: Jan. 27, 2009

(54) WRITE-CURRENT CONTROL CHIP AND MAGNETIC DISK DRIVE USING THE SAME

(75) Inventor: Nobuhiro Kuwamura, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 109 days.

(21) Appl. No.: 11/366,783

(22) Filed: Mar. 1, 2006

(65) Prior Publication Data
US 2006/0198041 A1    Sep. 7, 2006

(30) Foreign Application Priority Data
Mar. 1, 2005    (JP) ............................. 2005-056648

(51) Int. Cl.
*G11B 5/02*    (2006.01)
(52) U.S. Cl. .......................................... 360/68; 360/46
(58) Field of Classification Search ................. None
See application file for complete search history.

(56) References Cited

U.S. PATENT DOCUMENTS

| | | |
|---|---|---|
| 6,075,664 A | 6/2000 | Shimizu |
| 6,717,759 B1 * | 4/2004 | Himle et al. .................. 360/31 |
| 7,023,641 B2 * | 4/2006 | Doi et al. ...................... 360/68 |

* cited by examiner

*Primary Examiner*—Jason C Olson
(74) *Attorney, Agent, or Firm*—Townsend and Townsend and Crew LLP; Rambod Nader (57) ABSTRACT

Embodiments of the present invention provide a write-current control chip capable of effectively preventing adjacent track interference (ATI) that occurs depending on how a magnetic disk drive is used, and to provide a magnetic disk drive using the write-current control chip. In one embodiment, a write-current control chip and a magnetic disk drive using the same are provided. The write-current control chip includes: an acquisition module for acquiring the number of times of write processing in which a magnetic head writes data to a magnetic disk in the magnetic disk drive; a determination module, on the basis of the acquired number of times of write processing, for determining a write-current value used when the magnetic head writes data to the magnetic disk; and an instruction mechanism for instructing the magnetic head to write the data to the magnetic disk by use of the determined write-current value.

22 Claims, 8 Drawing Sheets

WRITE-CURRENT CONTROL CHIP AND MAGNETIC DISK DRIVE USING THE SAME

CROSS-REFERENCES TO RELATED APPLICATIONS

This application claims priority from Japanese Patent Application No. JP2005-056648, filed Mar. 1, 2005, the entire disclosure of which is incorporated herein by reference.

BACKGROUND OF THE INVENTION

The present invention relates to how to control a write current in a magnetic disk drive.

In recent years, magnetic disk drives including hard disk drives are used not only in computers, but also in hard disk recorders, portable music players, car navigation systems, and the like. Thus, the use of magnetic disk drives is expanding. Following this tendency, content handled by the magnetic disk drives is not limited to textual information. In recent years, the content covers music, images, video, and the like.

Figure 6:
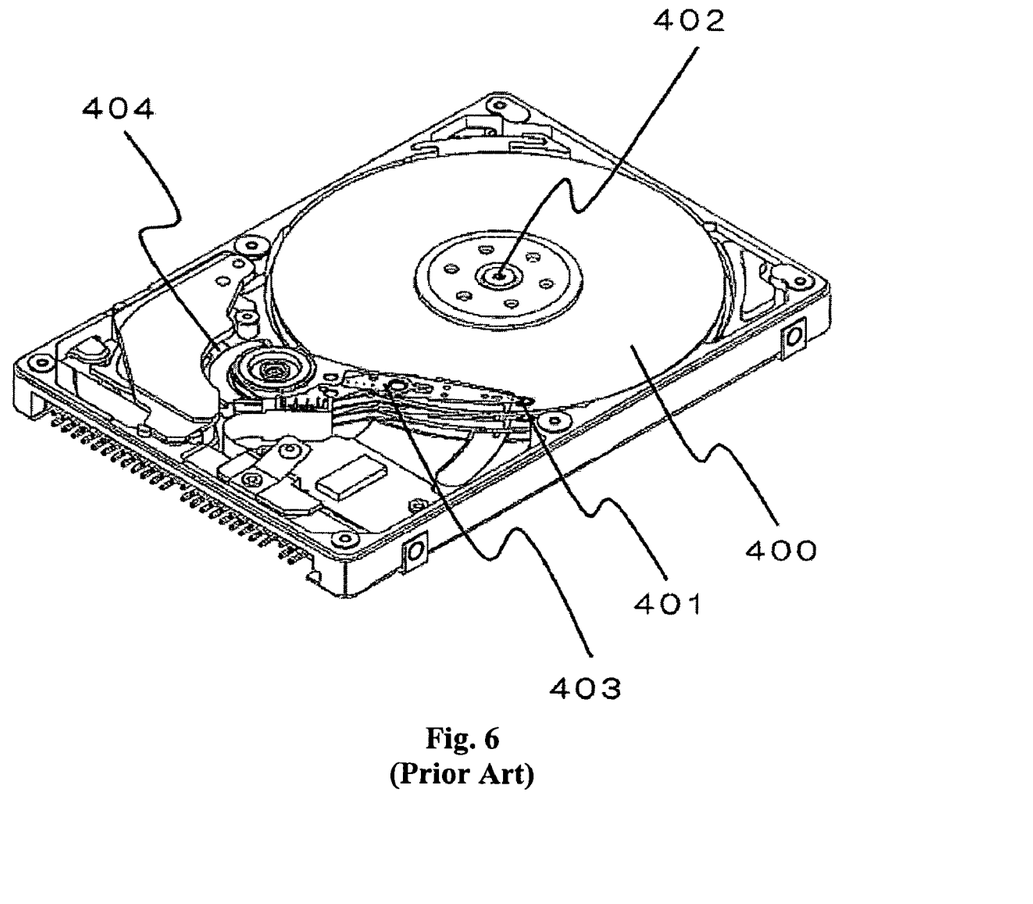
FIG. 6 is an explanatory diagram illustrating an example of a magnetic disk drive.

As shown in FIG. 6, for example, a magnetic disk drive comprises: a plurality of magnetic disks 400, each of which has a non-magnetic disk such as glass on which a magnetic layer is laminated; and a plurality of magnetic heads 401. Each of the magnetic heads 401 includes a write head for writing data to each magnetic disk 400, and a read head for reading data from said each magnetic disk 400. The plurality of magnetic disks 400 are mounted to one spindle 402. The plurality of magnetic heads 401, the number of which is the same as the number of surfaces of the magnetic disks 400, are mounted to arms 403. The arms 403 are pivotally moved by a voice coil motor (hereinafter referred to as "VCM") 404. When write processing of writing data to the magnetic disk 400 or read processing of reading data from the magnetic disk 400 is performed, the magnetic head 401 is moved to a position that faces a surface of the magnetic disk 400. When both of the write processing and the read processing are not performed, the magnetic head 401 is unloaded from the surface of the magnetic disk 400.

In such a magnetic disk drive, data is written to an area that is concentrically located on the magnetic disk 400; or data is read out from the area. This area is called a track.

Figure 7:
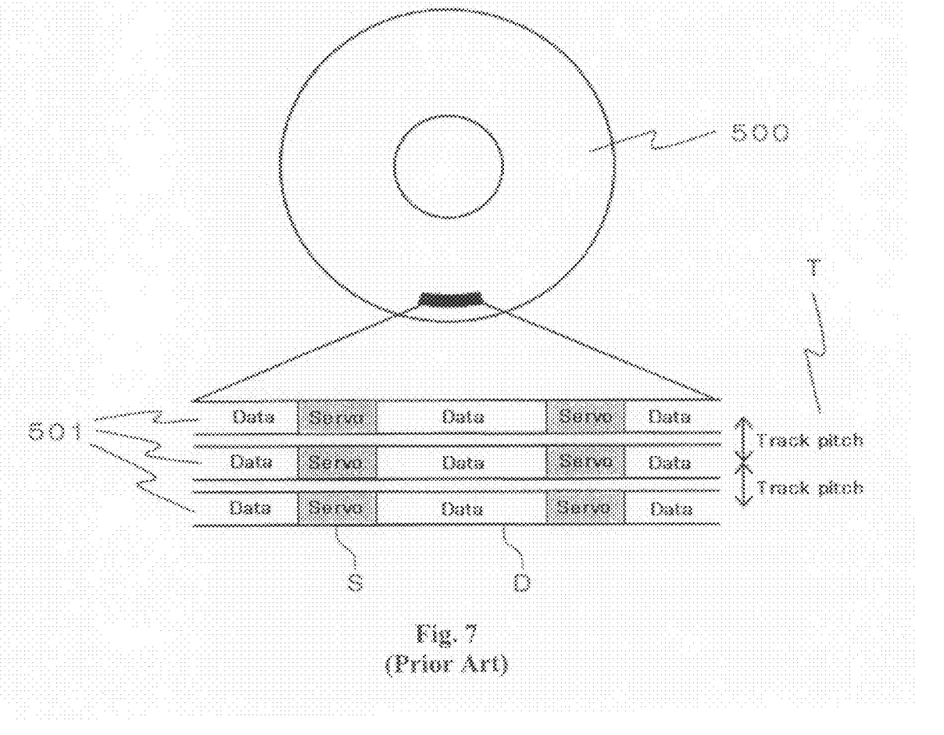
FIG. 7 is an explanatory diagram illustrating tracks located on a magnetic disk.

FIG. 7 is a diagram illustrating an example of tracks 501 located on a magnetic disk 500. As shown in FIG. 7, a plurality of tracks 501 are concentrically located at constant intervals (track pitch T). Each of the tracks 501 includes servo areas S and data areas D. The servo areas S are used to write information that is used when a magnetic head (not illustrated) is positioned at the time of read/write processing. The data areas D are used to write user data such as music data. It is to be noted that this data area D can be divided into the smallest units that can be accessed by the magnetic head. These units are called sectors.

It is demanded to increase the capacity of the magnetic disk 500 without sacrificing the miniaturization of the magnetic disk drive as a whole. In order to meet the demand, the recording density is improved, for example, by increasing the density (linear recording density) of data that is written in the circumferential direction of the tracks 501 located on the magnetic disk 500, or by reducing the width of each of the tracks 501 to narrow the track pitch T so that the track density is increased.

Figure 8:
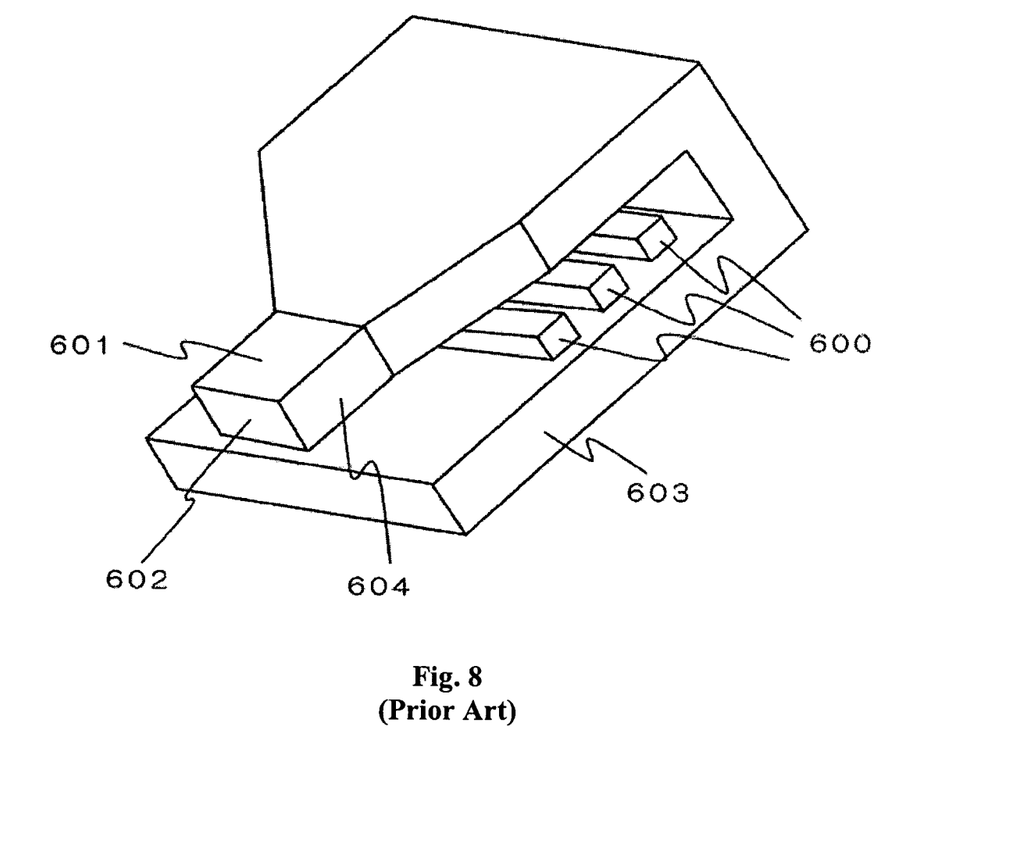
FIG. 8 is an explanatory diagram illustrating an example of a write head.

FIG. 8 is a diagram partially illustrating a structure of a write head. In this write head, by applying an electric current to a coil 600, a magnetic field is generated between a surface of an upper magnetic pole piece 601 that faces a magnetic disk surface (hereinafter referred to as "air bearing surface 602") and a lower magnetic pole piece 603. The magnetic field causes the magnetic disk surface to be magnetized, with the result that data is written there. In order to narrow the track width so that the recording density is improved as described above, for example, it is necessary to narrow the tip of the write head. However, if the tip of the write head becomes narrower and narrower, the tip is saturated with magnetic flux. Accordingly, a phenomenon will occur in which a magnetic field leaks out not only from the air bearing surface 602 of the upper magnetic pole piece 601 but also from the side 604 of the upper magnetic pole piece 601. For this reason, if the track pitch is narrow, a leakage field from this side 604 extends over adjacent tracks that are located on both sides of a target track to which data is written. This leakage field from the side 604 is feeble in comparison with a write magnetic field that is generated between the air bearing surface 602 and the lower magnetic pole piece 603 so as to write data to a target track. The leakage field in question, therefore, does not immediately exert an influence upon data in the adjacent tracks. However, the data in the adjacent tracks is gradually erased if the leakage field repeatedly extends over the adjacent tracks multiple times. As a result, a phenomenon occurs eventually in which the data cannot be read out. This phenomenon is called ATI (Adjacent Track Interference).

With the object of solving the problem of ATI, for example, taking into consideration a change in temperature of a magnetic disk drive, a write-current value was heretofore determined (for example, see patent document 1 (Japanese Patent Laid-open No. 10-312504)).

However, as described above, fields and applications in which magnetic disk drives are made use of are expanded. For example, even if the same magnetic disk drive is used, a possibility of the occurrence of ATI may change to a large extent depending on how the magnetic disk drive is used by end users.

To be more specific, for example, if an end user uses a magnetic disk drive as a large-capacity storage medium for a music player, once music data is written to the magnetic disk drive, what is performed is mainly reading of the music data. Since the number of times data is written is small, therefore, the problem of ATI hardly occurs.

On the other hand, for example, if the end user uses the magnetic disk drive as a storage medium to which image data as a photograph taken by a digital camera is temporarily written, image data is frequently written or erased. Accordingly, the problem of ATI is liable to occur.

The conventional magnetic disk drives described above could not sufficiently prevent such ATI encountered depending on how the magnetic disk drive was used by the end user, in some cases.

BRIEF SUMMARY OF THE INVENTION

The present invention has been devised in view of the above-mentioned problems. It is therefore a feature of the present invention to provide a write-current control chip capable of effectively preventing ATI encountered depending on how a magnetic disk drive is used, and a magnetic disk drive using the write-current control chip.

In order to solve the above-mentioned problems, according to one aspect of the present invention, there is provided a magnetic disk drive in which a magnetic head writes data to a magnetic disk. The magnetic disk drive includes: an acquisition module for acquiring the number of times of write processing in which data is written to the magnetic disk; a determination module, on the basis of the acquired number of times of write processing, for determining a write-current value used when the magnetic head writes data to the magnetic disk; and an instruction mechanism for instructing the magnetic head to write the data to the magnetic disk by use of the determined write-current value.

According to another aspect of the present invention, there is provided a magnetic disk drive in which a magnetic head writes data to a magnetic disk. The magnetic disk drive includes: an acquisition module for acquiring an amount of data written to the magnetic disk; a determination module, on the basis of the acquired amount of data, for determining a write-current value used when the magnetic head writes data to the magnetic disk; and an instruction mechanism for instructing the magnetic head to write the data to the magnetic disk by use of the determined write-current value.

DETAILED DESCRIPTION OF THE INVENTION

A write-current control chip (hereinafter referred to as "control chip") and a magnetic disk drive using the control chip in question according to one embodiment of the present invention will be below described with reference to the drawings. In this embodiment, the control chip operates as part of the magnetic disk drive.

Figure 1:
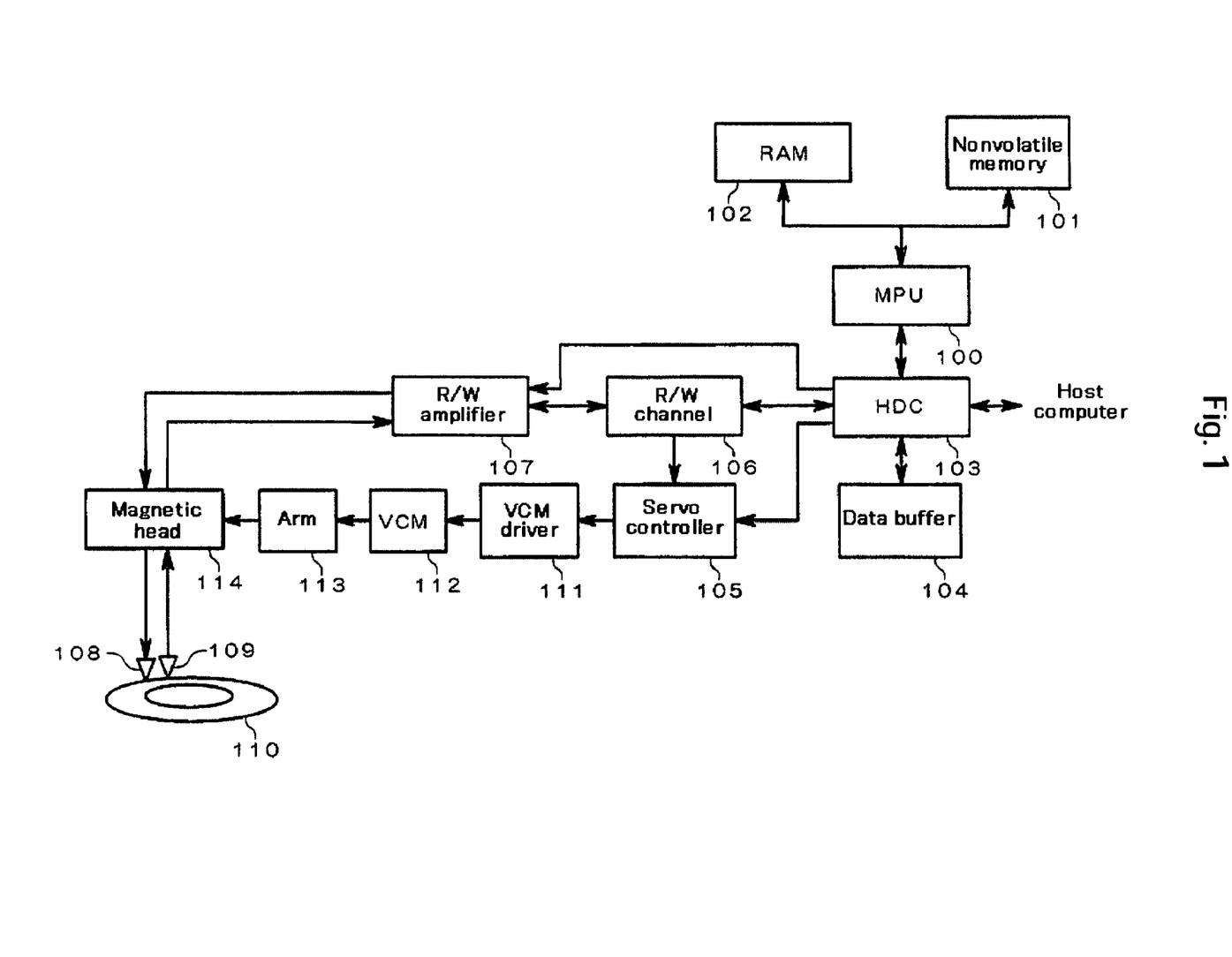
FIG. 1 is a block diagram illustrating a main configuration of a magnetic disk drive according to one embodiment of the present invention.

FIG. 1 is a block diagram illustrating a main configuration of the magnetic disk drive that uses this control chip. As shown in FIG. 1, this magnetic disk drive includes: a micro processing unit (hereinafter referred to as "MPU") 100; a nonvolatile memory 101; a random access memory (hereinafter referred to as "RAM") 102; a hard disk controller (hereinafter referred to as "HDC") 103; a data buffer 104; a servo controller 105; a R(read)/W(write) channel 106; a R/W amplifier 107; a write head 108; a read head 109; a magnetic disk 110; a VCM driver 111; a VCM 112; an arm 113; and a magnetic head 114.

The MPU 100 includes a CPU (central processing unit), and operates according to a program stored in the nonvolatile memory 101. In this embodiment, part of this MPU 100 performs main processing of write current control including the determination of a write-current value used in write processing. Specific contents of this write-current control processing will be described in detail later. This MPU 100 has an instruction part that generates instruction data including a command for specifying a write-current value, and then outputs the instruction data to the HDC 103. The nonvolatile memory 101 can be realized by use of a flash ROM (read only memory) or an EEPROM (electronically erasable and programmable read only memory). The nonvolatile memory 101 stores a program (software) to be executed by the MPU 100, and stores data that is generated as a result of the processing performed by the MPU 100. The RAM 102 is made use of as a working memory for keeping various kinds of data that is used in the processing performed by this MPU 100.

The HDC 103 receives, from a host computer, write data to be written to the magnetic disk 110, and stores the write data in question in the data buffer 104 formed of a SRAM (static RAM) or a DRAM (dynamic RAM). Next, this HDC 103 determines an address on the magnetic disk 110 at which the write data is written. More specifically, the HDC 103 determines: an identification number for identifying a surface of the magnetic disk 110 to which write data should be written; a track number, and a sector number, on the magnetic disk 110; and a number of the write head 108 that performs write processing on the surface of the magnetic disk 110. Then, the HDC 103 outputs to the servo controller 105 a command that moves the write head 108 to the determined address on the magnetic disk 110. After that, the servo controller 105 acquires, through the R/W amplifier 107 and the R/W channel 106, servo information that is written to the magnetic disk 110. The servo information is read out by the read head 109. On the basis of the acquired servo information, the servo controller 105 outputs a command to the VCM driver 111 so that the write head 108 is moved to a position of a track that includes a sector on the magnetic disk 110 specified by the HDC 103. According to the command received from the servo controller 105, this VCM driver 111 drives the VCM 112 so that the arm 113 pivotally moves. As a result, the write head 108 of the magnetic head 114, which is mounted at the tip of the arm 113, is moved to a target track position. Thus, as soon as it is ready for write processing, the HDC 103 reads out the write data stored in the data buffer 104, and then outputs the write data to the R/W channel 106. Incidentally, allowing for the rotation of the magnetic disk 110, this HDC 103 outputs the write data in question to the R/W channel 106 in the timing in which the write head 108 can write the write data to a target sector on the magnetic disk 110, the target sector being identified by an identification number.

The R/W channel 106 encodes the write data received from the HDC 103, and then outputs the encoded write data to the R/W amplifier 107. Using the write-current value specified by the instruction data received from the HDC 103, the R/W amplifier 107 instructs the write head 108 to write to the magnetic disk 110 the encoded write data received from the R/W channel 106. According to the instruction received from the RIW amplifier 107, the write head 108 writes the encoded write data to the magnetic disk 110.

In addition, also at the time of read processing, as is the case with the write processing, the read head 109 is first positioned at a track position on the magnetic disk 110. Here, at the track position a sector exists to which data to be read out is written. Next, on completion of the positioning, the read head 109 reads out the data from the target sector in the timing when the specified sector on the rotating magnetic disk 110 arrives at a position of the read head 109. Then, the R/W amplifier 107 amplifies a waveform of the data that has been read out. Further, the R/W channel 106 decodes the amplified data into an original state of data before outputting the decoded data to the HDC 103. The HDC 103 outputs the data to the host computer.

Figure 2:
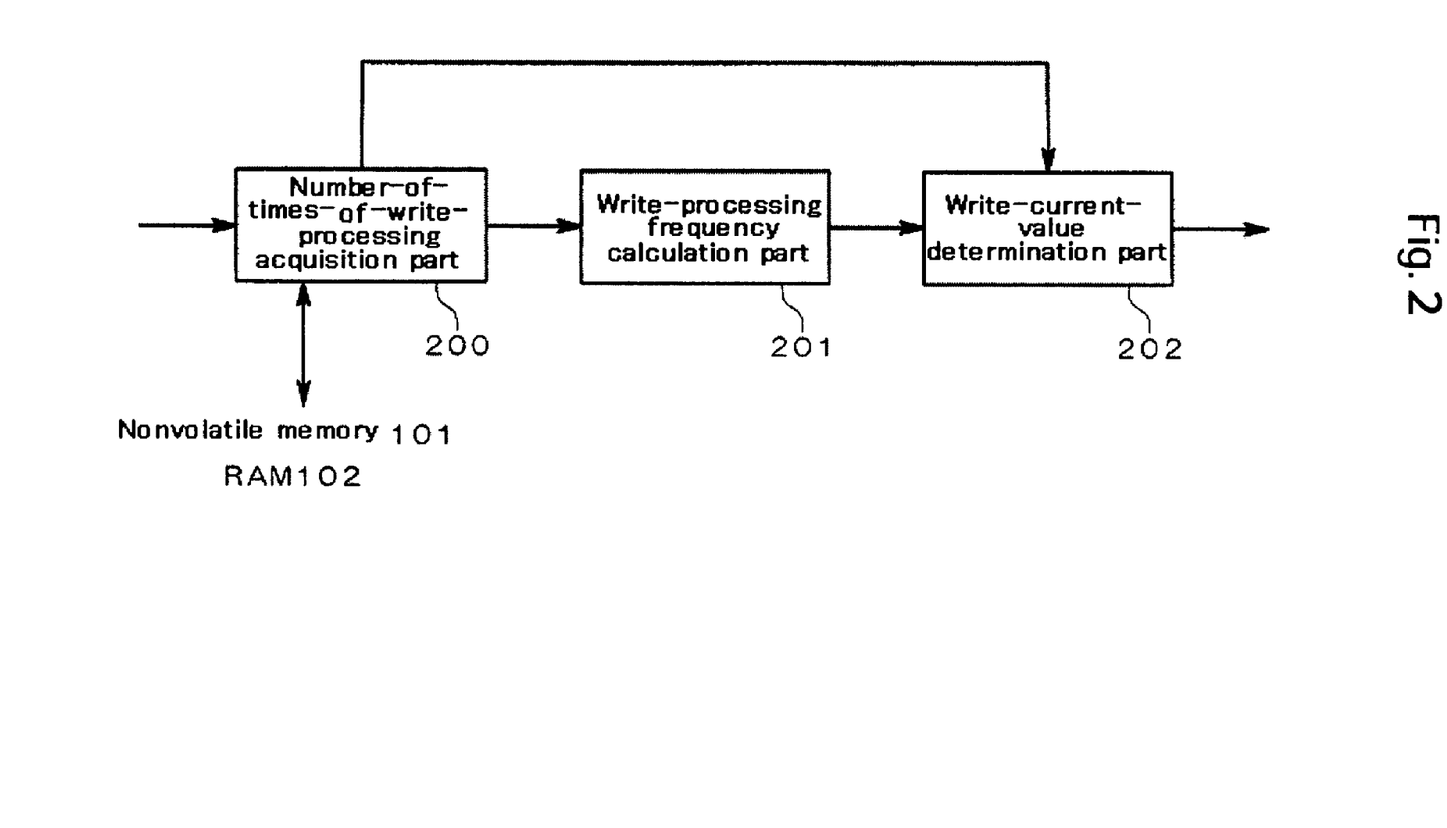
FIG. 2 is a functional block diagram illustrating, as an example, main processing of a write-current control chip according to one embodiment of the present invention.

Next, control processing of a write current will be described. The control processing is performed by a control chip used in the magnetic disk drive. In this embodiment, this control chip is a chip comprising the MPU 100 and the HDC 103. FIG. 2 is a functional block diagram illustrating main processing performed by the control chip. As shown in FIG. 2, this control chip functionally includes the number-of-times-of-write-processing acquisition part 200, a write-processing frequency calculation part 201, and a write-current-value determination part 202.

The number-of-times-of-write-processing acquisition part 200 acquires the number of times of write processing in which the write head 108 writes data to the magnetic disk 110 in the magnetic disk drive. More specifically, for example, this number-of-times-of-write-processing acquisition part 200 counts, for each surface of the magnetic disk 110, the number of times the HDC 103 (refer to FIG. 1) has received write data from the host computer, or the number of times the write head 108 has written the write data to the magnetic disk 110. After that, this acquisition part 200 generates a data table for storing the number of times of write processing. In the data table, a total value of the number of times of write processing counted for each magnetic disk surface is stored with the total value being associated with an identification number for identifying said each magnetic disk surface. The acquisition part 200 then stores the data table in the nonvolatile memory 101. It is to be noted that this acquisition part 200 may also write, to the magnetic disk surface, the data table for storing the number of times of write processing.

Moreover, for example, during the operation of the magnetic disk drive (for example, while the power of the magnetic disk drive stays in an On state), this number-of-times-of-write-processing acquisition part 200 may also keep the number of times of write processing in a memory, such as the RAM 102, to which read/write accesses can be made at high speed. To be more specific, in this case, for example, when the magnetic disk drive is started up (for example, when a program stored in the ROM is started up), this acquisition part 200 reads out the number of times of write processing stored in the nonvolatile memory 101, and keeps the number of times of write processing in the RAM 102. Then, when write processing is newly performed on a certain surface of a magnetic disk, the acquisition part 200 performs update processing of the data table for storing the number of times of write processing kept in the RAM 102. This update processing is performed by adding the new write processing in question to a total value of the number of times of write processing that is associated with the identification information for identifying the surface of the magnetic disk on which the new write processing has been performed.

Additionally, in this case, before the power of the magnetic disk drive is turned off (for example, when an instruction to turn the power of the magnetic disk drive off is inputted from the host computer), this number-of-times-of-write-processing acquisition part 200 stores the number of times of write processing, which is kept in the RAM 102, in the nonvolatile memory 101 or the magnetic disk 110. Incidentally, not only at the instant when the power of the magnetic disk drive is interrupted, but also during the operation, this acquisition part 200 may store the number of times of write processing, which is kept in the RAM 102, in the nonvolatile memory 101, for example, at predetermined time intervals. Together with the identification information of the magnetic disk surface, which is associated with the number of times of write processing after the update, this acquisition part 200 outputs the number of times of write processing after the update to the write-processing frequency calculation part 201 or the write-current-value determination part 202.

On the basis of the number of times of write processing that has been received from the number-of-times-of-write-processing acquisition part 200, the write-processing frequency calculation part 201 calculates, as a frequency of write processing, the number of times of write processing per unit time on a magnetic disk surface that is identified by the identification information received from the acquisition part 200. More specifically, the calculation part 201 calculates, for example, a period of time during which the power of the magnetic disk drive is in the On state (this period of time is Power On Hour (hereinafter referred to as "POH")), and then calculates a frequency value of write processing by dividing the number of times of write processing by the POH.

To be more specific, this write-processing frequency calculation part 201 acquires the elapsed time after the power of the magnetic disk drive is turned on (for example, the elapsed time after the supply of an electric current to the magnetic disk drive is started), and then keeps the elapsed time in the RAM 102. After that, the calculation part 201 calculates, as the latest POH, the elapsed time after the power in question is turned on until the number of times of write processing is received from the number-of-times-of-write-processing acquisition part 200. Then the calculation part 201 calculates the latest write-processing frequency value by dividing the number of times of write processing by the latest POH. It is to be noted that this elapsed time is counted by use of, for example, a timer included in the magnetic disk drive, and that this calculation part 201 acquires the elapsed time that is monitored by the timer.

Alternatively, for example, if the power of the magnetic disk drive is turned ON and is then turned OFF, the write-processing frequency calculation part 201 also may keep, in the nonvolatile memory 101, the elapsed time after the power of the magnetic disk drive is turned ON until the power is turned OFF. After that, when a write-processing frequency is calculated, the POH may be calculated which includes the elapsed time after the power is turned ON until the power is turned OFF. In this case, for example, when the calculation part 201 receives the number of times of write processing from the number-of-times-of-write-processing acquisition part 200, the calculation part 201 calculates an accumulated POH by adding the latest POH to the past POH after the power is turned ON in the past until the power is turned OFF. Then the calculation part 200 calculates an accumulated write-processing frequency value by dividing the number of times of write processing by the accumulated POH. Then, the calculation part 201 outputs, to the write-current-value determination part 202, the calculated write-processing frequency value together with the identification information of the magnetic disk surface corresponding to the write-processing frequency in question (more specifically, the identification information received from the acquisition part 200).

On the basis of the write-processing frequency value received from the write-processing frequency calculation part 201, the write-current-value determination part 202 determines a write-current value that is used when the write head 108 writes write data to a magnetic disk surface (i.e., a magnetic disk surface identified by the identification number received from the calculation part 201) corresponding to the write-processing frequency.

To be more specific, for example, if the nonvolatile memory 101 or the RAM 102 keeps a plurality of predetermined write-current candidate values, this write-current-value determination part 202 selects one write-current candidate value from among the plurality of write-current candidate values on the basis of the write-processing frequency value received from the write-processing frequency calculation part 201. Then the determination part 202 adopts the selected write-current candidate value as a write-current value used for actual write processing. Incidentally, the embodiment will be described, as an example, in a case where the nonvolatile memory 101 or the RAM 102 keeps three write-current candidate values (hereinafter referred to as a "first candidate value A", a "second candidate value B", and a "third candidate value C").

Figure 3:
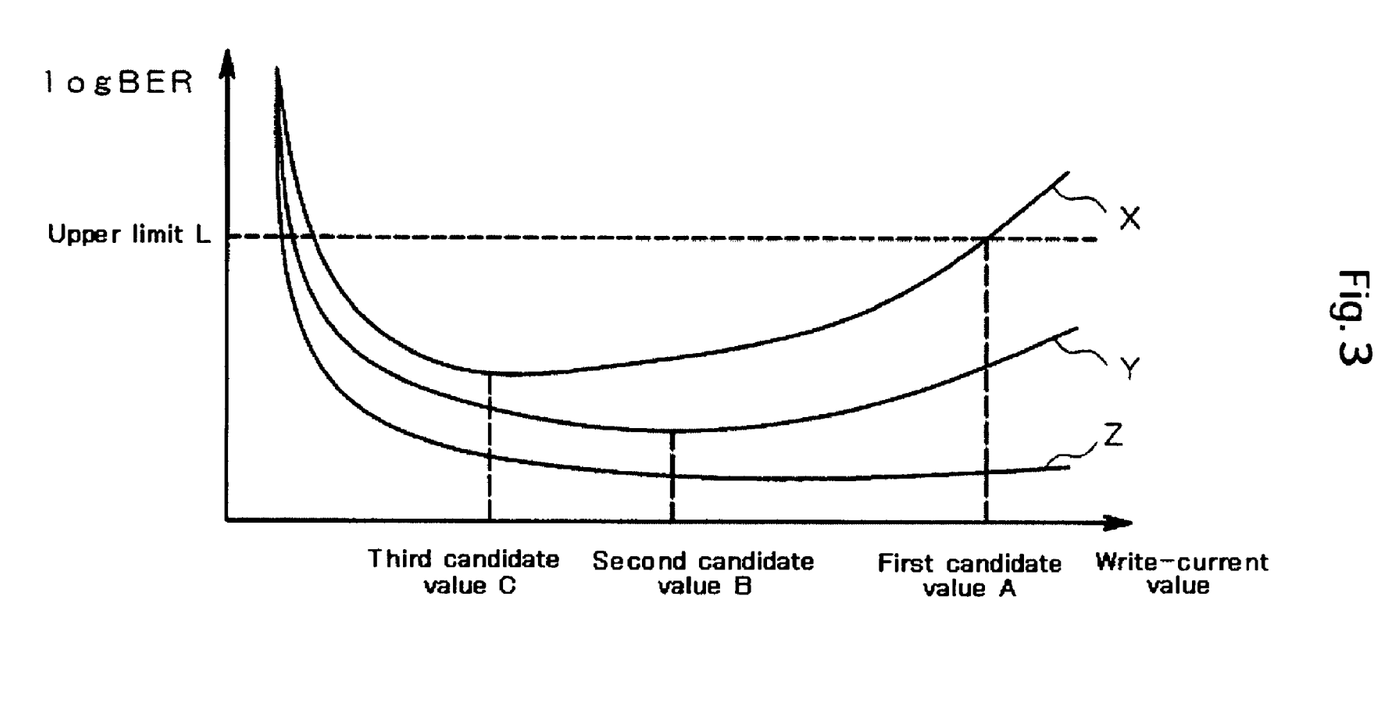
FIG. 3 is a graph illustrating write-current candidate values according to one embodiment of the present invention.

As shown in FIG. 3, these write-current candidate values, which are kept beforehand, are determined on the basis of the relationship between a write-current value used in the magnetic disk drive (a horizontal axis in FIG. 3) and a bit error rate (hereinafter referred to as "BER") obtained when the write-current value in question is used (a vertical axis in FIG. 3).

Here, when data is read out from the magnetic disk 110 by the read head 109 and the R/W channel 106 decodes the data, the BER is calculated as a ratio of the number of error bits of the decoded data to the number of bits of the decoded data that have been read out. In other words, the BER is calculated as a probability that an error occurs when a certain number of bits of data are read out. For example, if one-bit error occurs when $10^n$-bit data is read out, a calculation is made as follows: log BER $=\frac{1}{10^n}=-n$. Accordingly, in FIG. 3, it is understood that with a decrease in value of logBER in the vertical axis, a probability of the occurrence of an error decreases (more specifically, BER is small). Moreover, three curves X, Y, Z shown in FIG. 3 indicate respective logBER values corresponding to data read out from a specific track to which the data is written. These curves X, Y, Z are obtained when, by use of each write-current value shown in the horizontal axis, write processing is performed on the adjacent tracks, on both sides, of the specific track the predetermined number of times, i.e., x times, y times, and once respectively (x, y are integers that are two or more; and x is larger than y).

As shown in FIG. 3, if write processing is performed x times in the magnetic disk drive, the first candidate value A is set as the maximum write-current value at which logBER is smaller than a predetermined upper limit L. In other words, the first candidate value A is set as an upper limit of the write-current value.

In addition, if write processing is performed y times, which is smaller than x times, in the magnetic disk drive, the second candidate value B is set as a write-current value at which logBER becomes minimum. Incidentally, this number of times y is set as the number of times of write processing that is assumed to be performed in the average operation of the magnetic disk drive by end users.

Moreover, if write processing is performed x times in the magnetic disk drive, the third candidate value C is set as a write-current value at which logBER becomes minimum. In other words, the third candidate value C is set as a lower limit of the write-current value.

Incidentally, as shown in FIG. 3, the second candidate value B is set as a write-current value that is smaller than the first candidate value A, and that is large than the third candidate value C.

In this embodiment, by setting beforehand the write-current candidate values in this manner, if write processing is performed x times in the magnetic disk drive, the write-current-value determination part 202 can set a write-current value within a range within which, as shown in FIG. 3, a value of logBER does not exceed the predetermined upper limit L of logBER.

To be more specific, for example, if the nonvolatile memory 101 or the RAM 102 keeps a plurality of predetermined write-processing frequency threshold values, this write-current-value determination part 202 compares the write-processing frequency value received from the write-processing frequency calculation part 201 with the plurality of write-processing frequency threshold values. Then, on the basis of the result of the comparison, the determination part 202 selects from among three write-current candidate values one write-current candidate value that satisfies predetermined selection conditions, and then adopts the selected write-current candidate value as a write-current value.

To be more specific, in this case, for example, it is assumed that the nonvolatile memory 101 keeps two frequency threshold values in advance (hereinafter referred to as a "first frequency threshold value p" and a "second frequency threshold value q"; and the first frequency threshold value p is smaller than the second frequency threshold value q). If it is judged that the write-processing frequency received from the write-processing frequency calculation part 201 is smaller than the first frequency threshold value p that is one of the two frequency threshold values, this write-current-value determination part 202 selects the first candidate value A, and then adopts the first candidate value A as a write-current value. Next, if it is judged that the write-processing frequency is equivalent to the first frequency threshold value p or more, and that the write-processing frequency is smaller than the second frequency threshold value q, the determination part 202 adopts the second candidate value B as a write-current value. If it is judged that the write-processing frequency in question is equivalent to the frequency threshold value q or more, the determination part 202 adopts the third candidate value C as a write-current value.

In addition, the write-current-value determination part 202 may also determine a write-current value on the basis of the number of times of write processing received from the number-of-times-of-write-processing acquisition part 200. To be more specific, in this case, the determination part 202 compares, for example, the number of times of write processing received from the acquisition part 200 with a plurality of predetermined threshold values of the number of times of write processing, which are kept in the nonvolatile memory 101 or the RAM 102. After that, on the basis of the result of the comparison, the write-current-value determination part 202 selects, from among three write-current candidate values, one write-current candidate value that satisfies predetermined selection conditions, and then adopts the selected write-current candidate value as a write-current value.

To be more specific, in this case, it is assumed that two number-of-times threshold values are kept beforehand in the nonvolatile memory 101 (hereinafter referred to as a "first number-of-times threshold value v" and a "second number-of-times threshold value w"; and the first number-of-times threshold value v is smaller than the second number-of-times threshold value w). For example, if the number of times of write processing received from the number-of-times-of-write-processing acquisition part 200 is judged to be smaller than the first number-of-times threshold value v, this write-current-value determination part 202 adopts the first candidate value A as a write-current value. Next, if it is judged that the number of times of write processing is equivalent to the first number-of-times threshold value v or more, and that the number of times of write processing is smaller than the second number-of-times threshold value w, the determination part 202 adopts the second candidate value B as the write-current value. If it is judged that the number of times of write processing in question is larger than the second number-of-times threshold value w, the determination part 202 adopts the third candidate value C as the write-current value.

The write-current-value determination part 202 outputs to the HDC 103 a command that instructs the HDC 103 to perform, by use of the write-current value that has been determined in such a manner, write processing on a magnetic disk surface corresponding to the write-current value in question. As a result, by using the write-current value that has been determined by the write-current-value determination part 202, the write head 108 performs the write processing of writing to the magnetic disk surface that is specified by the determination part 202.

Furthermore, in this embodiment, the control chip may acquire the amount of data that is written to the magnetic disk 110 by the write head 108 so that a write-current value used when the write head 108 writes data to the magnetic disk in question is determined on the basis of the acquired amount of data.

Figure 5:
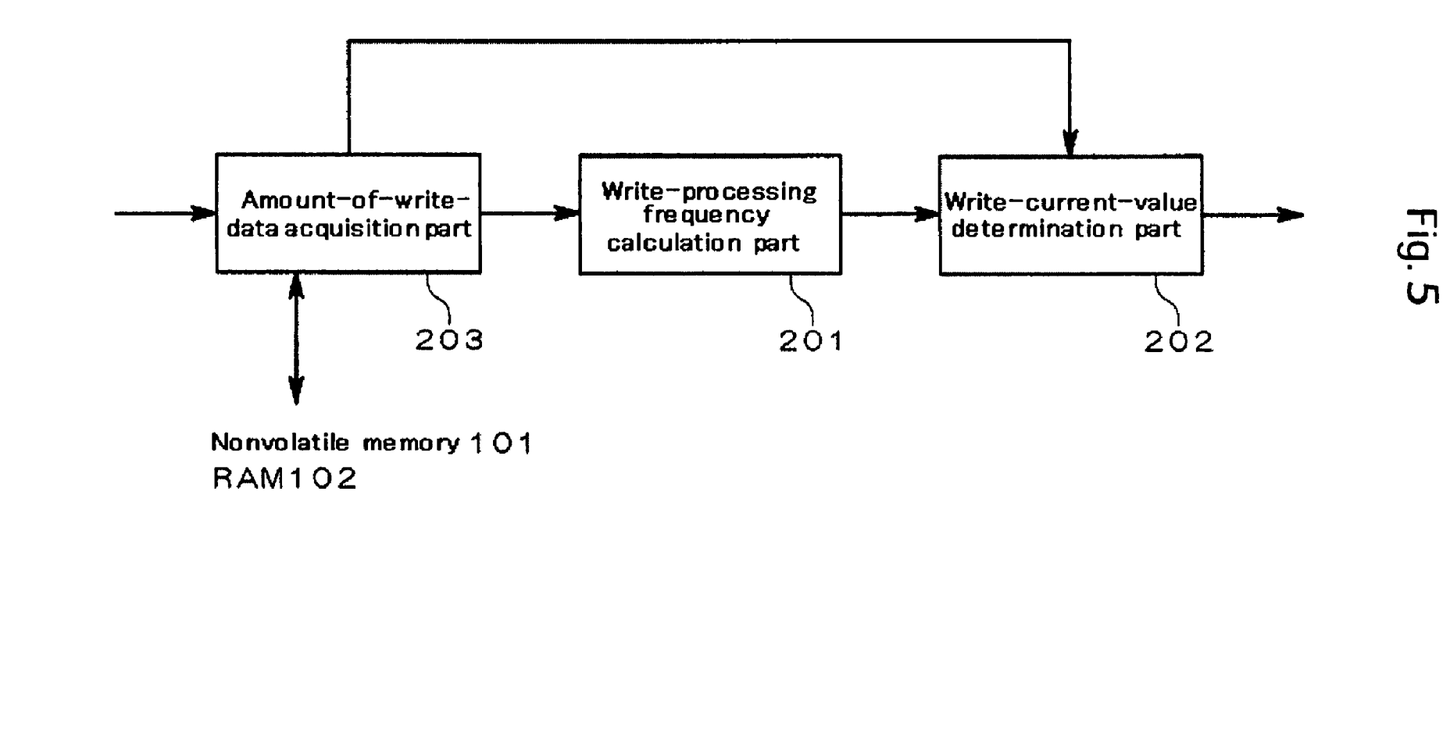
FIG. 5 is a functional block diagram illustrating, as another example, main processing of a write-current control chip according to one embodiment of the present invention.

FIG. 5 is a functional block diagram illustrating main processing performed by the control chip in the above case. To be more specific, as shown in FIG. 5, this control chip functionally includes an amount-of-write-data acquisition part 203, the write-processing frequency calculation part 201, and the write-current-value determination part 202. Incidentally, the calculation part 201 and the determination part 202 determine a write-current value on the basis of the amount of write data by performing processing similar to the processing of determining a write-current value on the basis of the number of times of write processing or the write-processing frequency, which has been described above.

To be more specific, this amount-of-write-data acquisition part 203 acquires, for example, the number of bytes of write data that is received from the host computer by the HDC 103, and also acquires, as the amount of write data: a total value of the number of bytes of write data that has been written to the magnetic disk 110 within a period of time from the shipment of the magnetic disk drive until the time at which the HDC 103 receives the write data from the host computer; a total value of the number of bytes of data that has been most recently written to the magnetic disk 110 within a fixed period of time; and the like. The acquisition part 203 then keeps the values in the nonvolatile memory 101 or the RAM 102.

In this case, the write-current-value determination part 202 determines a write-current value, for example, on the basis of the amount of write data that has been acquired by the amount-of-write-data acquisition part 203 in the past. To be more specific, in this case, as with the case where a write-current value is determined on the basis of the number of times of write processing, the determination part 202 compares the amount of write data received from the amount-of-write-data acquisition part 203 with a plurality of threshold values of the amount of write data, which are kept in the nonvolatile memory 101 or the RAM 102. On the basis of the result of the comparison, the determination part 202 selects, from among the plurality of write-current candidate values, one write-current candidate value that satisfies predetermined selection conditions, and then adopts the selected write-current candidate value as a write-current value. In this case, for example, as is the case with the example shown in FIG. 3, the plurality of write-current candidate values include: a first candidate value (an upper limit of the write-current value) that is set as the maximum write-current value at which logBER is smaller than a predetermined upper limit when a first predetermined amount of data is written in the magnetic disk drive; a second candidate value that is set as a write-current value at which logBER becomes minimum when a second amount of data, which is smaller than the first amount of data, is written; and a third candidate value (a lower limit of the write-current value) that is set as a write-current value at which logBER becomes minimum when the first amount of data is written. Incidentally, the write-current-value determination part 202 may also determine the write-current value within a range within which a value of logBER does not exceed a predetermined upper limit of logBER when the first amount of data is written in the magnetic disk drive.

In this case, as is the case with the above-mentioned calculation of a write-processing frequency from the number of times of write processing, the write-processing frequency calculation part 201 calculates, as a write-processing frequency, the amount of write data that has been written per unit time by dividing the amount of write data received from the amount-of-write-data acquisition part 203 by POH. For example, as is the case with the determination of the write-current value on the basis of the number of times of write processing and the write-processing frequency described above, the write-current-value determination part 202 determines a write-current value on the basis of the write-processing frequency received from the calculation part 201.

Figure 4:
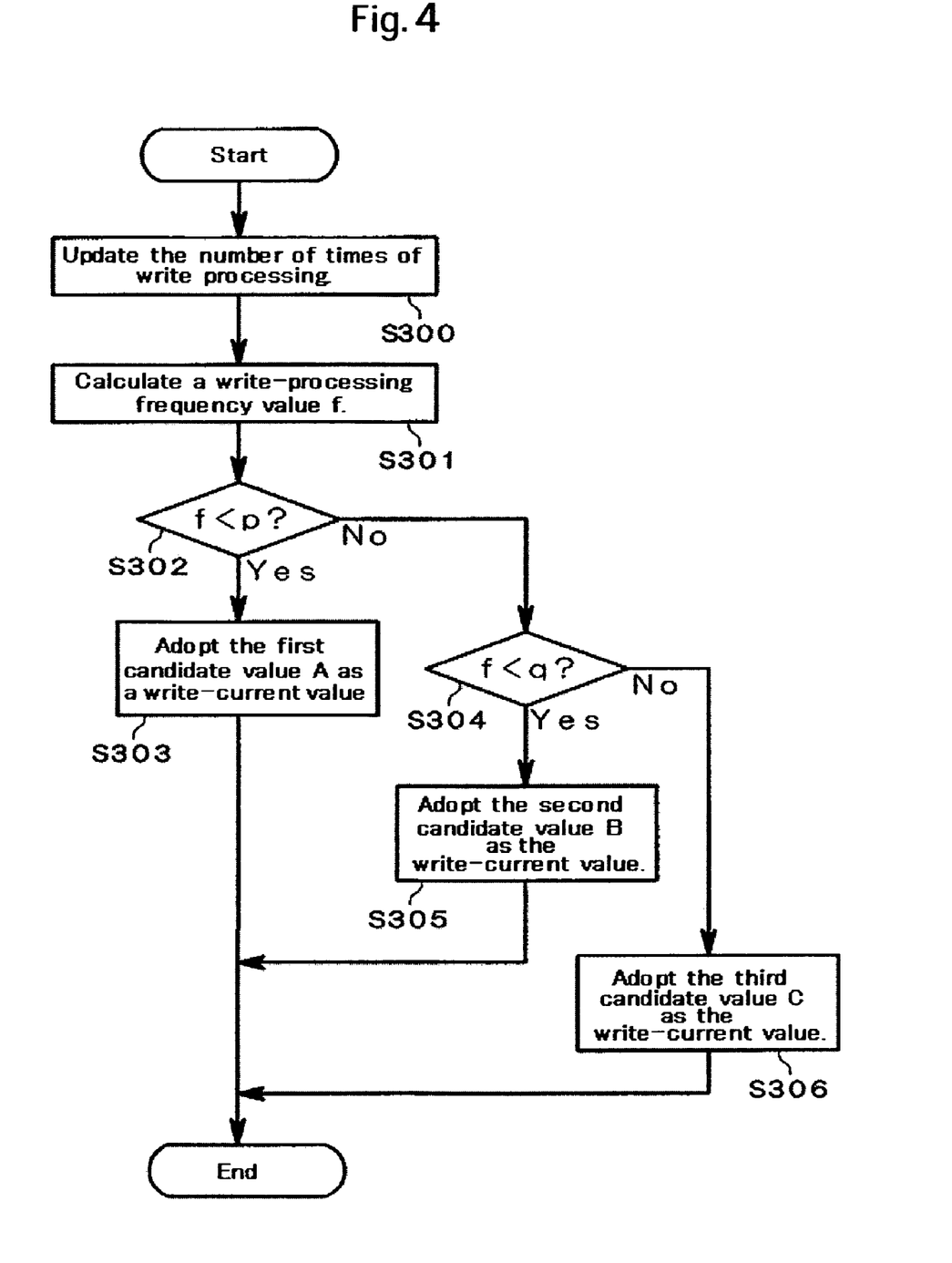
FIG. 4 is a flowchart illustrating main steps executed by a write-current control chip according to one embodiment of the present invention.

Next, a flow of processing in which the control chip determines a write-current value will be described. Here, a description will be made, as an example, of a case where the magnetic disk drive is configured beforehand (for example, at the time of shipment of the magnetic disk drive) to use the second candidate value B as a write-current value, and then the control chip changes the write-current value used in the magnetic disk drive according to the frequency of write processing performed in the magnetic disk drive. It is to be noted that the nonvolatile memory 101 keeps two write-processing frequency threshold values (hereinafter referred to as a "first frequency threshold value p" and a "second frequency threshold value q") that are predetermined on the basis of, for example, the performance and reliability of the magnetic disk drive.

FIG. 4 is a flowchart illustrating, as an example, main steps of processing performed by the control chip. The HDC 103 may receive new write data from the host computer, or write processing may be performed so that the write data in question is written to a certain magnetic disk surface (hereinafter referred to as a "target disk surface"). In this case, as shown in FIG. 4, the number-of-times-of-write-processing acquisition part 200 updates a total value of the number of times of write processing by adding the number of times of new write processing in question to the total value of the number of times of past write processing, which is kept in the RAM 102 with this total value in question being associated with an identification number of the target disk surface (S300). Then, the acquisition part 200 outputs, to the write-processing frequency calculation part 201, the identification number of the target disk and the number of times of write processing after the update.

On receipt of the number of times of write processing from the number-of-times-of-write-processing acquisition part 200, the write-processing frequency calculation part 201 calculates, as an accumulated POH, the elapsed time until the receipt of the number of times of write processing. After that, the calculation part 201 calculates a write-processing frequency value f corresponding to the target disk surface by dividing the write-processing frequency by the accumulated POH (S301). Then, the calculation part 201 outputs the write-processing frequency value f and the identification number of the target disk to the write-current-value determination part 202.

First of all, the determination part 202 judges whether or not the write-processing frequency value f received from the calculation part 201 is smaller than the first frequency threshold value p (S302).

In this case, if it is judged that the write-processing frequency value f is smaller than the first frequency threshold value p (Yes in the step S302), the determination part 202 adopts the first candidate value A as a write-current value to be used for write processing on the target disk (S303), and then the processing ends.

On the other hand, if it is judged that the write-processing frequency f is equivalent to the first frequency threshold value p or more in a step S302 (No in the step S302), the determination part 202 further judges whether or not the write-processing frequency f is smaller than the second frequency threshold value q (S304).

Here, if it is judged that the write-processing frequency value f is smaller than the second frequency threshold value q (Yes in the step S304), the determination part 202 adopts the second candidate value B as a write-current value to be used for write processing on the target disk (S305), and then the processing ends.

On the other hand, if it is judged that the write-processing frequency f is equivalent to the second frequency threshold value q or more in the step S304 (No in the step S304), the write-current-value determination part adopts the third candidate value C as a write-current value to be used for the write processing on the target disk (S306), and then ends the processing.

It is to be noted that the write-current control chip and the magnetic disk drive according to the present invention are not limited to the examples described above. For example, the number-of-times-of-write-processing acquisition part 200 may also be configured to acquire not only the number of times of write processing but also the number of times of read processing. In this case, as a write-processing frequency, the write-processing frequency calculation part 201 calculates, for example, a ratio of the number of times of write processing to the total number of times of processing that is the sum of the number of times of write processing and the number of times of read processing, a ratio of the number of times of write processing to the number of times of read processing, or the like.

In addition, the write-processing frequency calculation part 201 may acquire the elapsed time in various kinds of timing when the control chip or the magnetic disk drive performs processing so as to calculate POH by use of the elapsed time. Examples of the various kinds of timing include, for example, timing when the HDC 103 receives write data from the host computer, and timing when the number-of-times-of-write-processing acquisition part 200 updates the number of times of write processing. To be more specific, in this case, the calculation part 201 calculates a write-processing frequency value by dividing a total value of the number of times of write processing by POH, for example. The total value of the number of times of write processing is within the past fixed period of time, i.e., within a predetermined fixed period of time before the acquisition part 200 updates the number of times of write processing. The POH indicates the past fixed period of time. Additionally, in this case, the determination part 202 determines the write-current value on the basis of the write-processing frequency within the latest fixed period of time that has been calculated by the calculation part 201, and the magnetic disk drive then performs the write processing by use of the determined write-current value.

Moreover, for example, even if the calculation part 201 cannot receive the number of times of write processing from the acquisition part 200, the calculation part 201 may also calculate the write-processing frequency value at predetermined time intervals. To be more specific, in this case, according to a predetermined schedule, i.e., in periodical timing, the calculation part 201 calculates a write-processing frequency value by dividing a total value of the number of times of write processing by a total value of POH. This total value of the number of times of write processing is one held by the RAM 102 or the nonvolatile memory 101 at that time. This write processing is all the ones that have been performed after the shipment of a magnetic disk drive. Alternatively, the calculation part 201 calculates a write processing frequency value by dividing a total value of the number of times of write processing within the latest fixed period of time, i.e., a past fixed period of time from that point of time, among the total value of the number of times of write processing, by POH corresponding to the past fixed period of time. In this case, the write-current-value determination part 202 periodically determines a write-current value on the basis of the write-processing frequency received from the calculation part 201, and the magnetic disk drive performs the write processing by use of the periodically determined write-current value.

Further, for example, the HDC 103 may receive a plurality of write data from the host computer, and the HDC 103 may keep part of the plurality of write data in the data buffer 104. In this case, the number-of-times-of-write-processing acquisition part 200 also acquires the number of write data kept in the data buffer 104 (hereinafter referred to as "the number of waiting write processing"). In addition, the write-current-value determination part 202 also determines a write-current value on the basis of the number of waiting write processing.

More specifically, in this case, the acquisition part 200 acquires the number of waiting write processing, for example, while the write head 108 performs write processing relating to one piece of write data. Then, the acquisition part 200 outputs, to the calculation part 201, an updated total value of the number of times of write processing to which the number of waiting write processing in question is added. The calculation part 201 calculates a write-processing frequency value on the basis of the number of times of write processing including the number of waiting write processing, and then outputs the write-processing frequency value to the determination part 202. After that, the determination part 202 determines a write-current value on the basis of the write-processing frequency value, and then outputs a command to the HDC 103 to perform write processing by use of the write-current value.

In this case, for example, the magnetic disk drive may also perform write processing for write data corresponding to the number of waiting write processing (i.e., write data kept in the data buffer 104) by use of the write-current value determined on the basis of the number of waiting write processing. To be more specific, for example, the data buffer 104 keeps each write data by associating it with an identification number for identifying the write data. The control chip associates the write-current value determined on the basis of the number of waiting write processing, with an identification number for identifying write data corresponding to the number of waiting write processing for outputting them to the HDC 103. Thus, the control chip instructs the HDC to perform the processing of the write data by use of the write-current value.

In this case, the control chip may determine the write-current value on the basis of the amount of write data that is kept in the data buffer 104 (i.e., the amount of data to be written to the magnetic disk 110 by executing write processing of the write data). More specifically, in this case, for example, the amount-of-write-data acquisition part 203 acquires the number of bytes of write data kept in the data buffer 104; and the write-current-value determination part 202 determines a write-current value used for write processing of the write data on the basis of the number of bytes of the write data, or on the basis of a write-processing frequency calculated by the write-processing frequency calculation part 201 by use of the number of bytes of the write data.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive in which a magnetic head writes data to a magnetic disk, said magnetic disk drive comprising:
an acquisition module to acquire and store a total number of times of write processing in which data is written to the magnetic disk;
a determination module, on the basis of the total acquired number of times of write processing, to determine a write-current value used when the magnetic head writes data to the magnetic disk; and
an instruction mechanism to instruct the magnetic head to write the data to the magnetic disk by use of the determined write-current value.

2. A magnetic disk drive according to claim 1, further comprising a memory configured to keep a write-current lower limit and a write-current upper limit;
wherein said determination module determines the write-current value within a range from a value equal to the write-current lower limit to a value smaller than the write-current upper limit.

3. A magnetic disk drive according to claim 2, wherein:
said write-current lower limit is a write-current value at which a bit error rate becomes minimum when write processing is performed the predetermined number of times; and
said write-current upper limit is the maximum write-current value among write-current values at which a bit error rate is smaller than a predetermined threshold value when write processing is performed the predetermined number of times.

4. A magnetic disk drive according to claim 1, further comprising:
a calculation module to calculate a write-processing frequency per unit time on the basis of the acquired number of times of write processing;
wherein said determination module determines the write-current value on the basis of the calculated write-processing frequency.

5. A magnetic disk drive according to claim 4, wherein:
said calculation module calculates the write-processing frequency by dividing the acquired number of times of write processing by a period of time while power of the magnetic disk stays in an ON state.

6. A magnetic disk drive in which a magnetic head writes data to a magnetic disk, said magnetic disk drive comprising:
an acquisition module to acquire and store a total amount of data written to the magnetic disk;
a determination module, on the basis of the total acquired amount of data, to determine a write-current value used when the magnetic head writes data to the magnetic disk; and
an instruction mechanism to instruct the magnetic head to write the data to the magnetic disk by use of the determined write-current value.

7. A magnetic disk drive according to claim 6, further comprising a memory configured to keep a write-current lower limit and a write-current upper limit,
wherein said determination module determines the write-current value within a range from a value equal to the write-current lower limit to a value smaller than the write-current upper limit.

8. A magnetic disk drive according to claim 7, wherein:
said write-current lower limit is a write-current value at which a bit error rate becomes minimum when the predetermined amount of data is written; and
said write-current upper limit is the maximum write-current value among write-current values at which a bit error rate is smaller than a predetermined threshold value when the predetermined amount of data is written.

9. A magnetic disk drive according to claim 6, further comprising a calculation module to calculate the amount of write data per unit time on the basis of the acquired amount of data;
wherein said determination module determines the write-current value on the basis of the calculated amount of write data per unit time.

10. A magnetic disk drive according to claim 9, wherein:
said calculation module calculates an amount of write data per unit time by dividing the acquired amount of data by a period of time while power of the magnetic disk stays in the ON state.

11. A write-current control chip used in a magnetic disk drive in which a magnetic head writes data to a magnetic disk, said write-current control chip comprising:
an acquisition module to acquire and store a total number of times of write processing in which data is written to the magnetic disk;
a determination module, on the basis of the total acquired number of times of write processing, to determine a write-current value used when the magnetic head writes data to the magnetic disk; and
an instruction module to generate instruction data to be used to instruct the magnetic head to write the data to the magnetic disk by use of the determined write-current value.

12. A write-current control chip according to claim 11, further comprising a memory configured to keep a write-current lower limit and a write-current upper limit;
wherein said determination module determines the write-current value within a range from a value equal to the write-current lower limit to a value smaller than the write-current upper limit.

13. A write-current control chip according to claim 12, wherein:
said write-current lower limit is a write-current value at which a bit error rate becomes minimum when write processing is performed the predetermined number of times; and
said write-current upper limit is the maximum write-current value among write-current values at which a bit error rate is smaller than a predetermined threshold value when write processing is performed the predetermined number of times.

14. A write-current control chip according to claim 11, further comprising:
a calculation module to calculate a write-processing frequency per unit time on the basis of the acquired number of times of write processing;
wherein said determination module determines the write-current value on the basis of the calculated write-processing frequency.

15. A write-current control chip according to claim 14, wherein:
said calculation module calculates the write-processing frequency by dividing the acquired number of times of write processing by a period of time while power of the magnetic disk stays in an ON state.

16. A write-current control chip according to claim 14, wherein:
said calculation module calculates the write-processing frequency by dividing the acquired number of time of write processing which includes the number of waiting write processing by a period of time while power of the magnetic disk stays in an ON state.

17. A write-current control chip used in a magnetic disk drive in which a magnetic head writes data to a magnetic disk, said write-current control chip comprising:
an acquisition module to acquire and store a total amount of data written to the magnetic disk;
a determination module, on the basis of the total acquired amount of data, to determine a write-current value used when the magnetic head writes data to the magnetic disk; and
an instruction module to generate instruction data to be used to instruct the magnetic head to write the data to the magnetic disk by use of the determined write-current value.

18. A write-current control chip according to claim 17, further comprising a memory configured to keep a write-current lower limit and a write-current upper limit,
wherein said determination module determines the write-current value within a range from a value equal to the write-current lower limit to a value smaller than the write-current upper limit.

19. A write-current control chip according to claim 18, wherein:
said write-current lower limit is a write-current value at which a bit error rate becomes minimum when the predetermined amount of data is written; and
said write-current upper limit is the maximum write-current value among write-current values at which a bit error rate is smaller than a predetermined threshold value when the predetermined amount of data is written.

20. A write-current control chip according to claim 17, further comprising a calculation module to calculate the amount of write data per unit time on the basis of the acquired amount of data;
wherein said determination module determines the write-current value on the basis of the calculated amount of write data per unit time.

21. A write-current control chip according to claim 20, wherein:
said calculation module calculates an amount of write data per unit time by dividing the acquired amount of data by a period of time while power of the magnetic disk stays in the ON state.

22. A write-current control chip according to claim 20, wherein:
said calculation module calculates the write-processing frequency by dividing the acquired number of time of write processing which includes the number of waiting write processing by a period of time while power of the magnetic disk stays in an ON state.

* * * * *